United States Patent
Noda

(10) Patent No.: US 11,260,737 B2
(45) Date of Patent: Mar. 1, 2022

(54) VEHICLE BATTERY COOLING DEVICE AND BATTERY MODULE

(71) Applicant: PANASONIC INTELLECTUAL PROPERTY MANAGEMENT CO., LTD., Osaka (JP)

(72) Inventor: Yoshitoshi Noda, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 99 days.

(21) Appl. No.: 16/717,684

(22) Filed: Dec. 17, 2019

(65) Prior Publication Data
US 2020/0127346 A1    Apr. 23, 2020

Related U.S. Application Data

(63) Continuation of application No. PCT/JP2018/023068, filed on Jun. 18, 2018.

(30) Foreign Application Priority Data

Jun. 20, 2017    (JP) .............................. JP2017-120589

(51) Int. Cl.
| | | |
|---|---|---|
| H01M 10/00 | (2006.01) | |
| B60K 1/04 | (2019.01) | |
| H01M 10/625 | (2014.01) | |
| H01M 10/656 | (2014.01) | |
| B60L 50/64 | (2019.01) | |
| H01M 50/20 | (2021.01) | |

(52) U.S. Cl.
CPC ............... *B60K 1/04* (2013.01); *B60L 50/64* (2019.02); *H01M 10/625* (2015.04); *H01M 10/656* (2015.04); *H01M 50/20* (2021.01)

(58) Field of Classification Search
CPC ......... H01M 10/625623; H01M 10/62; H01M 10/656; H01M 10/6561; H01M 10/6567; H01M 50/20; H01M 50/22; H01M 50/202; B60K 1/04; B60L 50/64
See application file for complete search history.

(56) References Cited

U.S. PATENT DOCUMENTS

2017/0271727 A1*  9/2017  Ito ........................ H01M 50/20

FOREIGN PATENT DOCUMENTS

| JP | 2006-336556 | * 12/2006 | ............. F01P 11/00 |
|---|---|---|---|
| JP | 2009-238654 | 10/2009 | |
| JP | 2011-101514 | 5/2011 | |
| JP | 2013-012463 | 1/2013 | |
| JP | 2017-004677 | 1/2017 | |

OTHER PUBLICATIONS

International Search Report issued in International Pat. Appl. No. PCT/JP2018/023068, dated Aug. 28, 2018, along with an English translation thereof.

* cited by examiner

*Primary Examiner* — Raymond Alejandro
(74) *Attorney, Agent, or Firm* — Greenblum & Bernstein, P.L.C.

(57) ABSTRACT

A vehicle battery cooling device adapted to cool a battery pack including a plurality of unit batteries includes: a case that contains a cooling fluid for cooling the battery pack; a pipe which runs inside the case and in which a cooling medium for cooling the cooling fluid is caused to flow; and a control valve that is provided in the pipe and discharges the cooling medium in the case in accordance with a temperature of the battery pack.

12 Claims, 6 Drawing Sheets

# VEHICLE BATTERY COOLING DEVICE AND BATTERY MODULE

BACKGROUND

1. Field

The present disclosure relates to vehicle battery cooling devices and battery modules.

2. Description of the Related Art

A battery module for supplying power to a motor as a driving source is mounted on a hybrid vehicle or an electric vehicle. The battery module includes a battery pack comprised of a plurality of unit batteries. Thermal runaway (abnormal temperature increase) may occur in the unit battery provided in the battery pack due, for example, to a short circuit.

A battery device (battery module) designed to inject an incombustible cooling medium from a predetermined valve to a location exposed to the combustion gas generated from the unit battery accommodated in the case is known as a technology to cool the unit battery in which thermal runaway occurs (see, for example, patent literature 1).

[Patent literature 1] JP2009-238654

In the battery device according to patent literature 1, the device may not be sufficiently cooled even when the cooling medium is injected into the interior of the case, if the unit battery in which thermal runaway occurs is remote from the valve that injects the cooling medium. It is conceivable to detect the position of the unit battery in which thermal runaway occurs and change the position or direction in which the cooling medium is injected. In this case, however, the setup may become complicated.

SUMMARY

The disclosure addresses the above-described issue, and a general purpose thereof is to provide a vehicle battery cooling device capable of cooling the entirety of the battery pack uniformly by means of a simple setup, when thermal runaway occurs in the unit battery in the battery pack.

An embodiment of the present disclosure relates to a vehicle battery cooling device adapted to cool a battery pack including a plurality of unit batteries. The vehicle battery cooling device includes: a case that contains a cooling fluid for cooling the battery pack; a pipe which runs inside the case and in which a cooling medium for cooling the cooling fluid is caused to flow; and a control valve that is provided in the pipe and discharges the cooling medium in the case in accordance with a temperature of the battery pack.

BRIEF DESCRIPTION OF THE DRAWINGS

Embodiments will now be described by way of examples only, with reference to the accompanying drawings which are meant to be exemplary, not limiting and wherein like elements are numbered alike in several Figures in which.

DETAILED DESCRIPTION

Figure 1:
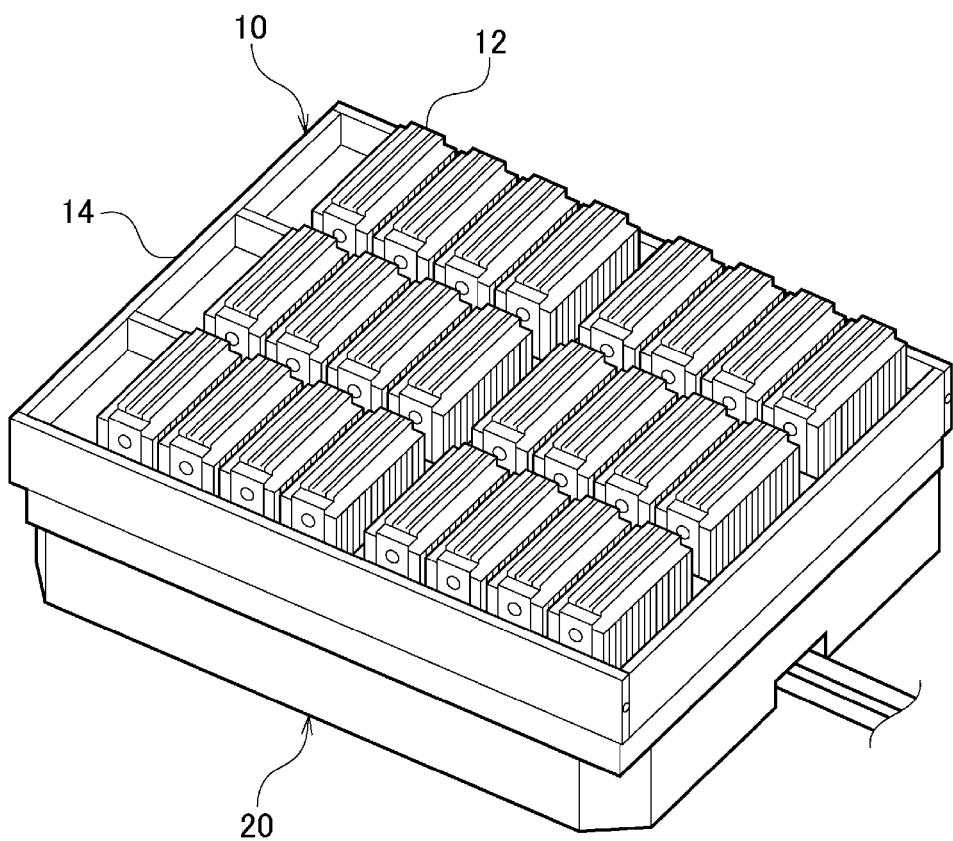
FIG. 1 shows a battery module according to the embodiment.

The invention will now be described by reference to the preferred embodiments. This does not intend to limit the scope of the present invention, but to exemplify the invention.

In the embodiment described in the following, the same constituting elements shall be denoted by the same reference numerals, and duplicative explanations will be omitted. For convenience of the description, some of the constituting elements are omitted as needed in the drawings.

A summary will be given before describing the embodiment of the present disclosure in specific details. The embodiment relates to a vehicle battery cooling device for cooling a battery pack mounted on a vehicle. The vehicle battery cooling device includes a case in which the battery pack is mounted and a pipe that runs inside the case. A cooling fluid for cooling the battery pack is contained in the case. A cooling medium for cooling the cooling fluid is caused to flow in the pipe. A control valve is provided in the pipe in the case. In the case thermal runaway occurs in any of a plurality of unit batteries forming the battery pack, the control valve is opened to discharge the cooling medium in the case (in the cooling fluid). The cooling medium will be at an extremely low temperature (−20° or below) when relieved from a low-pressure condition and discharged to the atmosphere. As the cooling medium spreads in the cooling fluid, the temperature of the entirety of the case is lowered. This makes it possible to cool the entirety of the battery pack uniformly. The unit battery in which thermal runaway occurs can be cooled regardless of its position. The embodiment will now be given in specific details.

FIG. 1 is a perspective view of a battery module 100 according to the embodiment of the present disclosure. The battery module 100 includes a battery pack 10 and a vehicle battery cooling device 20. Hereinafter, the vehicle battery cooling device 20 will simply be referred to as the cooling device 20. The battery pack 10 includes a plurality of unit batteries 12 connected to each other and supplies power to a driving motor of a vehicle (not shown). The unit battery 12 is a lithium ion secondary battery and is housed in a housing 14 made of an aluminum alloy. The battery pack 10 is mounted on the top surface of the cooling device 20, and each unit battery 12 is cooled from the bottom side.

Figure 2:
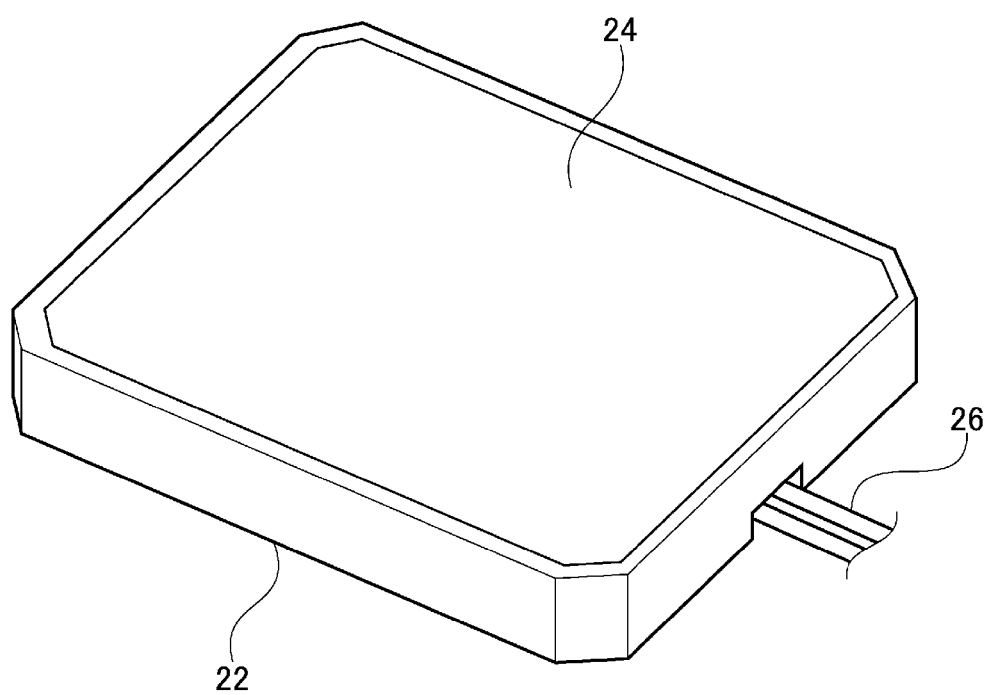
FIG. 2 is a perspective view of the cooling device according to the embodiment.
Figure 3:
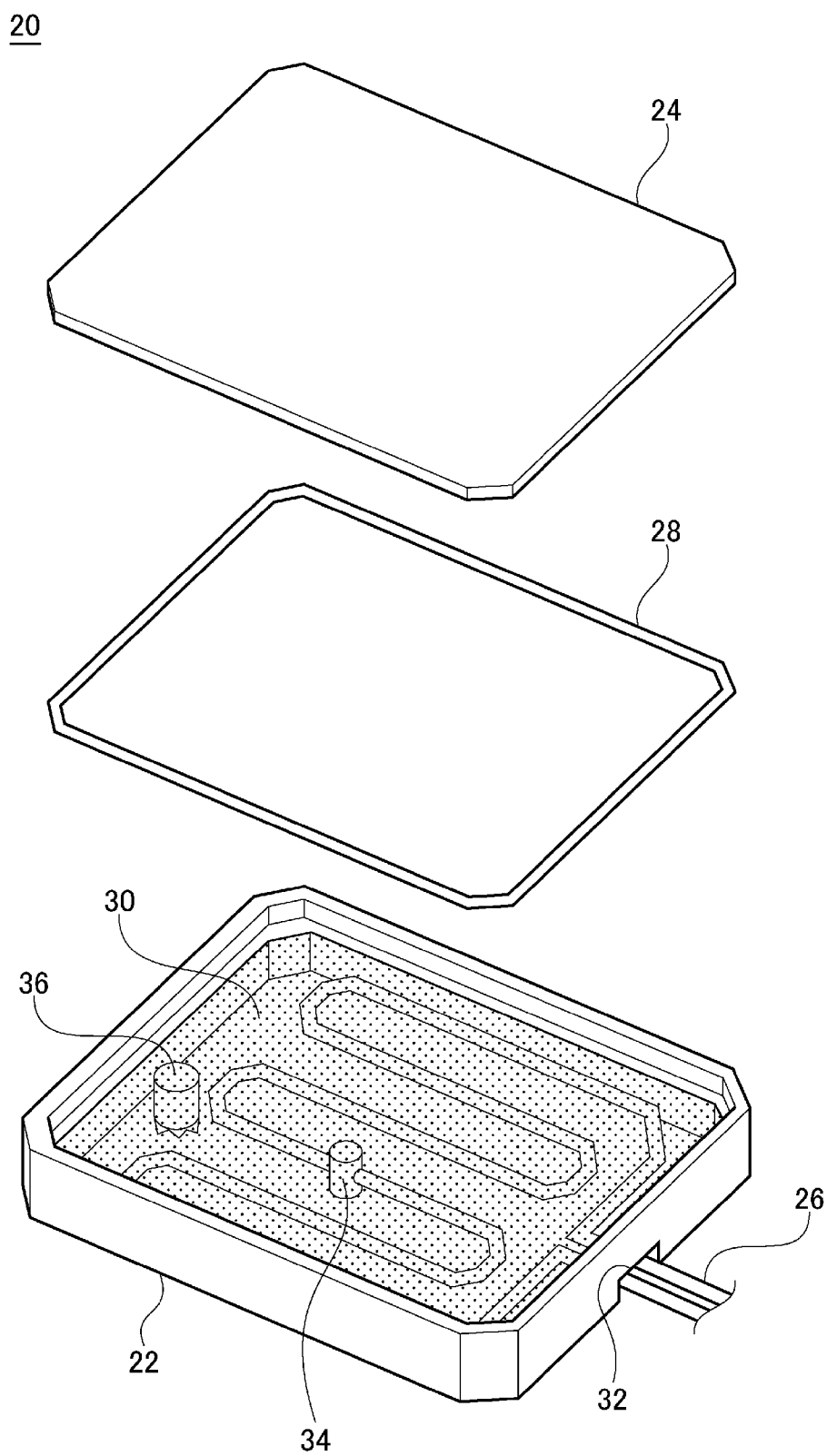
FIG. 3 is an exploded view of the cooling device according to the embodiment.

FIG. 2 is a perspective view of the cooling device 20 according to the embodiment of the present disclosure, and FIG. 3 is an exploded view thereof. The cooling device 20 includes a case 22, a cover 24, a pipe 26, an O-ring 28, a control valve 34, and a stirrer 36. The case 22 is made of a resin material to have a shape of box with an open top. A cooling fluid 30 is contained in the case 22. The cooling fluid 30 is an antifreezing fluid that contains ethylene glycol. The cover 24 is made of a resin material to have the same shape as the opening of the case 22. The cover 24 covers the opening of the case 22 and is fixed accordingly. The O-ring 28 is sandwiched between the case 22 and the cover 24 and seals a space that contains the cooling fluid 30.

The pipe 26 runs inside the case 22. The cooling medium for cooling the cooling fluid 30 is caused to flow in the pipe 26. One example of the cooling medium is hydro fluoro carbon (HFC). The pipe 26 is guided into the interior of the case 22 through a pipe port 32 in the lateral surface. The pipe 26 runs back and forth inside the case 22 and is guided outside through the pipe port 32. The pipe port 32 is sealed by a sealing member (not shown). The control valve 34 is provided in the pipe 26 that runs inside the case 22.

The control valve 34 is a motor-operated two-way valve configured such that the valve is opened and closed by moving a plunger by means of a solenoid. The control valve 34 opens in accordance with the temperature of the battery pack 10 to discharge the cooling medium into the case 22. The cooling medium will be at an extremely low temperature (−20° or below) by being relieved from a low-pressure condition in the pipe 26 and discharged to the atmosphere. As the discharged cooling medium spreads in the cooling fluid 30, the temperature of the entirety of the case 22 is lowered so that the battery pack 10 is cooled uniformly. The embodiment is non-limiting as to the position of the control valve 34 so long as the control valve 34 is located inside the case 22. The case 22 is also provided with a pressure control valve (not shown). The pressure control valve is opened when the control valve 34 discharges the cooling medium to maintain the pressure inside constant by discharging the gas within the case outside.

The stirrer 36 is a stirring fan provided with a rotary impeller. The stirrer 36 is provided inside the case 22 to stir the cooling fluid 30. The stirring by the stirrer 36 reduces the temperature difference in the cooling fluid 30 inside the case 22. The stirring also accelerates the spread of the cooling medium in the case 22 as the cooling medium is discharged from the control valve 34. This lowers the temperature of the entirety of the case 22 in a short period of time. An electric water pump may be used as the stirrer 36. In this case, the same advantage is provided. The operation of the control valve 34 and the stirrer 36 is controlled by a cooling control unit described later connected via a wiring that runs through the pipe port 32.

Figure 4:
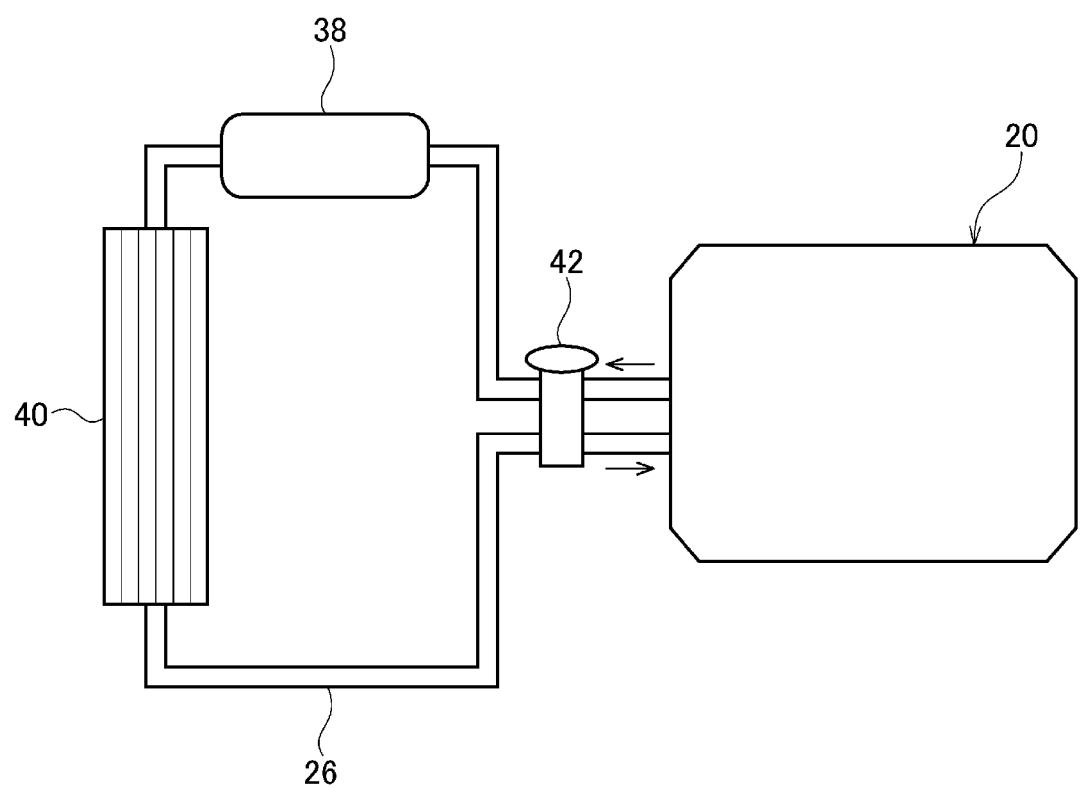
FIG. 4 is a perspective view showing a route of the pipe according to the embodiment.

FIG. 4 is a perspective view showing a route of the pipe 26 according to the embodiment of the disclosure. A compressor 38, a condenser 40, and an expansion valve 42 are provided in the route of the pipe 26. The compressor 38 compresses the cooling medium (gas cooling medium) that has passed through the cooling device 20 and absorbed the heat of the battery pack 10. The cooling medium compressed and turned into a high-pressure gas is cooled in the condenser 40 by an air blower (not shown) and is liquified accordingly. The liquified cooling medium is injected into the pipe 26 inside the cooling device 20 from a minute hole of the expansion valve 42. The cooling medium is placed in a gas-liquid mixture state at a low temperature and a low pressure. The cooling medium absorbs the heat around, including the heat of the battery pack 10, via the cooling fluid 30 as it passes through the interior of the cooling device 20. The cooling medium that has cooled the battery pack 10 via the cooling fluid flows from the cooling device 20 to return to the compressor 38.

Figure 5:
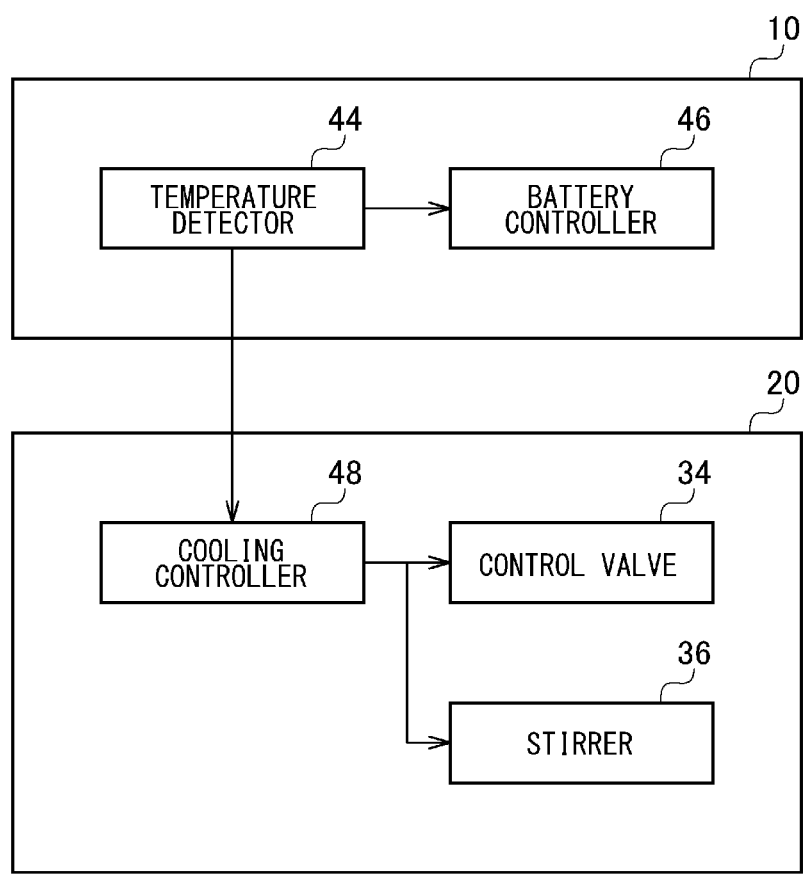
FIG. 5 is a block diagram showing a configuration of the battery module according to the embodiment.

FIG. 5 is a block diagram showing a configuration of the battery module 100 according to the embodiment of the present disclosure. The blocks depicted in the block diagram of this specification are implemented in hardware such as devices like a CPU of a computer or mechanical components, and in software such as a computer program etc. FIG. 5 depicts functional blocks implemented by the cooperation of these elements. Therefore, it will be understood by those skilled in the art that the functional blocks may be implemented in a variety of manners by a combination of hardware and software.

The battery pack 10 includes a temperature detection unit 44 and a battery control unit 46. The temperature detection unit 44 detects the temperature of the battery pack 10 according to a publicly-known related-art technology. The battery control unit 46 controls the supply of power from the battery pack 10 to the respective parts including the driving motor. When the temperature of the battery pack 10 exceeds a first temperature, the battery control unit 46 cuts off the supply of power to the respective parts and deactivates the battery pack 10. The first temperature is a threshold value at which it is determined that an abnormality occurs in the unit battery 12 inside the battery pack 10 and is predefined.

The cooling device 20 includes a cooling control unit 48 for controlling the control valve 34 and the stirrer 36. When the temperature of the battery pack 10 after an elapse of a predetermined period of time since the deactivation by the battery control unit 46 exceeds a second temperature, the cooling control unit 48 opens the control valve 34 and drives the stirrer 36. The second temperature is a temperature at which it is determined that thermal runaway occurs in one or more unit batteries 12 in the battery pack 10. The second temperature is predefined to be equal to or higher than the first temperature.

Figure 6:
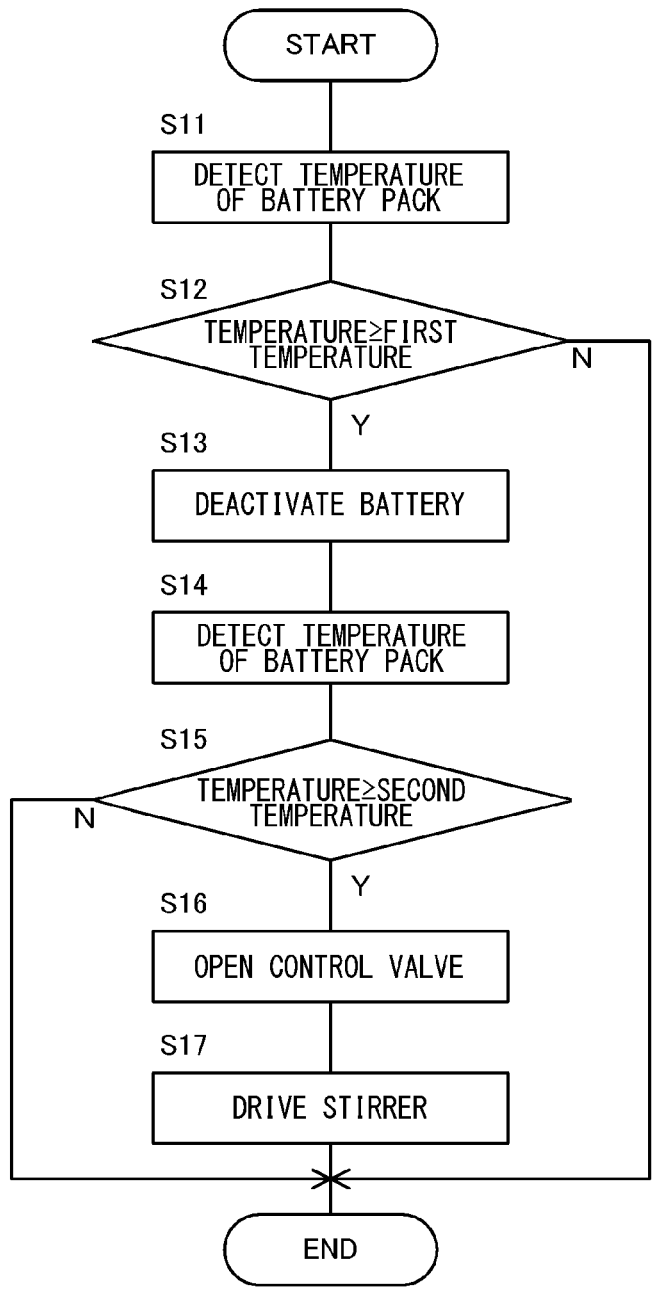
FIG. 6 is a flowchart of a cooling process performed by the battery module according to the embodiment.

FIG. 6 is a flowchart of a cooling process performed by the battery module 100 according to the embodiment of the present disclosure. The battery module 100 performs the cooling process shown in FIG. 6 repeatedly at a predetermined period.

First, the temperature detection unit 44 detects the temperature of the battery pack 10 (S11). The battery control unit 46 then compares the temperature of the battery pack 10 with the aforementioned first temperature (S12). When the temperature of the battery pack 10 is equal or higher than the first temperature (Y in S12), there is a possibility that an abnormality occurs in the unit battery 12 inside the battery pack 10. Therefore, the battery control unit 46 cuts off the supply of power to the respective parts and deactivates the battery pack 10 (S13). When the temperature of the battery pack 10 is below the first temperature (N in S12), it is determined that the unit batteries 12 inside the battery pack 10 are operating normally, and the process is terminated.

In the case the battery pack 10 is deactivated, the temperature detection unit 44 detects the temperature of the battery pack 10 again upon an elapse of a predetermined period of time since the deactivation (S14). The cooling control unit 48 compares the temperature of the battery pack 10 with the aforementioned second temperature (S15). When the temperature of the battery pack 10 is not lowered and is increased to the second temperature or higher despite an elapse of a predetermined period of time since the deactivation (Y in S15), there is a possibility that thermal runaway due to, for example, a short circuit occurs in one or more unit batteries 12 so that the cooling control unit 48 opens the control valve 34 (S16). The cooling control unit 48 also drives the stirrer 36 (S17). When the control valve 34 is opened, the cooling medium is injected into the interior of the case 22, which is placed at a lower pressure than the interior of the pipe 26, spreading the cooling medium inside the case 22. Further, the stirrer 36 is driven so that the cooling medium spreads in the entirety of the case 22 in one sitting. This lowers the temperature of the entirety of the case 22 and cools the battery pack 10 uniformly.

When the temperature becomes lower than the second temperature after an elapse of a predetermined period of time since the deactivation of the battery pack 10 (N in S15), it is determined that thermal runaway of the unit battery 12 is not occurring. Accordingly, the cooling medium is not discharged, and the process is terminated. The cooling device 20 in which the cooling medium is discharged once cannot continue to be used and so need be replaced. Unnecessary replacement of the cooling device 20 is avoided by performing a process whereby the cooling medium is not discharged when the temperature is lowered after the battery pack 10 is deactivated. When the temperature of the battery pack 10 becomes the first temperature or higher, the operator may be alerted of an abnormality of the battery via a display or a speaker provided in the vehicle interior. This can prompt the operator to react to the situation promptly.

According to the embodiment of the present disclosure, the battery pack 10 is cooled uniformly with a simple setup when thermal runaway occurs in the unit battery in the battery pack 10. The entirety of the battery pack 10 is cooled so that the unit battery 12 in which thermal runaway occurs is cooled properly regardless of its position.

Described above is an explanation based on an exemplary embodiment. The embodiment is intended to be illustrative only and it will be understood by those skilled in the art that various modifications to constituting elements and processes could be developed and that such modifications are also within the scope of the present disclosure.

For example, a plurality of control valves 34, a plurality of stirrers 36, or a plurality of control valves 34 and stirrers 36 may be provided in the cooling device 20. In this case, the temperature of the entirety of the case 22 is lowered in a short period of time when the control valve 34 is opened. The temperature detection unit 44 may detect the temperature of the plurality of unit batteries 12 individually. In this case, an abnormality of the unit battery 12 is detected more precisely. In the embodiment, the stirrer 36 is driven when the control valve 34 is opened, but stirrer 36 may be driven at all times. In this case, the entirety of the case 22 is maintained at a uniform temperature so that the cooling performance of the battery pack 10 is improved.

One embodiment of the present disclosure is summarized below. An embodiment of the present disclosure relates to a vehicle battery cooling device 20 adapted to cool a battery pack 10 including a plurality of unit batteries 12. The vehicle battery cooling device 20 includes: a case 22 that contains a cooling fluid 30 for cooling the battery pack 10; a pipe 26 which runs inside the case 22 and in which a cooling medium for cooling the cooling fluid 30 is caused to flow; and a control valve 34 that is provided in the pipe 26 and discharges the cooling medium in the case 22 in accordance with a temperature of the battery pack 10.

According to this embodiment, the cooling medium having a lower temperature than the cooling fluid 30 spreads when the control valve 34 is opened in accordance with the temperature of the battery pack 10, lowering the temperature of the entirety of the case 22. This uniformly cools the entirety of the battery pack 10 in which an abnormality such as thermal runaway of the unit battery 12 occurs.

The device may include a stirrer 36 that stirs the cooling fluid 30. In this case, the cooling medium discharged from the control valve 34 spreads in the cooling fluid 30 in a short period of time so that the battery pack 10 is cooled in a shorter period of time.

The device may include a cooling control unit 48 that controls the control valve 34. The cooling control unit 48 may open the control valve 34 when the battery pack 10, which is deactivated upon detection of an abnormality of the unit battery, reaches a predetermined temperature. In this case, the control valve 34 is inhibited from being opened undesirably to discharge the cooling medium.

Another embodiment of the present disclosure relates to a battery module 100 including: the vehicle battery cooling device 20; and a battery pack 10 mounted in the vehicle battery cooling device 20 and including a plurality of unit batteries 12. According to this embodiment, the entirety of the battery pack 10 is cooled uniformly when an abnormality such as thermal runaway of the unit battery 12 occurs so that troubles such as injection of the combustion gas or fire from the unit battery 12 are inhibited.

While various embodiments have been described herein above, it is to be appreciated that various changes in form and detail may be made without departing from the spirit and scope of the invention(s) presently or hereafter claimed.

CROSS-REFERENCE TO RELATED APPLICATION

This application is based upon and claims the benefit of priority from the prior Japanese Patent Application No. 2017-120589, filed on Jun. 20, 2017, the entire contents of which are incorporated herein by reference.

What is claimed is:

1. A vehicle battery cooling device configured to cool batteries, the vehicle cooling device comprising:
    an enclosure that contains a cooling fluid for cooling the batteries, the cooling fluid containing at least ethylene glycol;
    a pipe located in the enclosure, at least a part of an outer-surface of the pipe being adjacent to the cooling fluid in the enclosure, wherein at least a part of the pipe extends through the cooling fluid in the enclosure;
    a cooling medium configured to move inside the pipe, the cooling medium containing at least hydro fluoro carbon; and
    a valve provided on the pipe in the enclosure,
    wherein, the valve, in operation, outputs the cooling medium from the pipe into the cooling fluid in the enclosure, in accordance with a temperature of the batteries.

2. The vehicle battery cooling device according to claim 1, further comprising:
    a stirrer that stirs the cooling fluid in the enclosure.

3. The vehicle battery cooling device according to claim 1, further comprising:
    a controller configured to control the valve, wherein
    the controller, in operation, opens the valve when a temperature of the batteries reaches a predetermined temperature.

4. The vehicle battery cooling device according to claim 2, further comprising:
    a controller configured to control the valve, wherein
    the controller, in operation, opens the valve when a temperature of the batteries reaches a predetermined temperature.

5. The vehicle battery cooling device according to claim 1, wherein the pipe is defined as a first pipe,
    the first pipe in the enclosure is configured to be connected to a route of a second pipe located outside of the enclosure,
    the route of the second pipe includes at least a compressor and a condenser, and
    the cooling medium is configured to move along the route of the second pipe.

6. The vehicle battery cooling device according to claim 1, wherein
    the cooling medium spreads in the cooling fluid in the enclosure when the valve outputs the cooling medium from the pipe to the cooling fluid in the enclosure.

7. The vehicle battery cooling device according to claim 1, further comprising, a temperature detector configured to detect the temperature of the batteries.

8. The vehicle battery cooling device according to claim 1, wherein
the valve outputs the cooling medium from the pipe to the cooling fluid in the enclosure, when the temperature of the batteries is higher than a threshold temperature.

9. A battery module comprising:
the vehicle battery cooling device according to claim 1; and
the batteries located with the vehicle battery cooling device, the batteries including a plurality of unit batteries.

10. A battery module comprising:
the vehicle battery cooling device according to claim 2; and
the batteries located with the vehicle battery cooling device, the batteries including a plurality of unit batteries.

11. A battery module comprising:
the vehicle battery cooling device according to claim 3; and
the batteries located with the vehicle battery cooling device, the batteries including a plurality of unit batteries.

12. A battery module comprising:
the vehicle battery cooling device according to claim 4; and
the batteries located with the vehicle battery cooling device, the batteries including a plurality of unit batteries.

* * * * *